(12) United States Patent
Naylor et al.

(10) Patent No.: US 8,783,375 B2
(45) Date of Patent: Jul. 22, 2014

(54) SCRAPER FOR A COULTER ASSEMBLY

(75) Inventors: Matthew Stuart Naylor, Saskatoon (CA); David Daniel Seib, Saskatoon (CA); Nicholas Carl Broberg, Regina (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 13/204,088

(22) Filed: Aug. 5, 2011

(65) Prior Publication Data

US 2013/0032366 A1 Feb. 7, 2013

(51) Int. Cl.
*A01B 15/16* (2006.01)

(52) U.S. Cl.
USPC .......................................... 172/558

(58) Field of Classification Search
USPC ......................................... 172/558
See application file for complete search history.

(56) References Cited

U.S. PATENT DOCUMENTS

| | | | | |
|---|---|---|---|---|
| 1,545,895 | A | * | 7/1925 | Hamilton ................. 172/561 |
| 1,721,876 | A | * | 7/1929 | Davis et al. ............... 172/558 |
| 4,113,030 | A | * | 9/1978 | Walker .................... 172/566 |
| 4,998,488 | A | * | 3/1991 | Hansson ................... 111/187 |
| 6,237,696 | B1 | * | 5/2001 | Mayerle .................... 172/558 |
| 6,260,632 | B1 | | 7/2001 | Bourgault et al. |
| 6,874,584 | B2 | | 4/2005 | Butterfield et al. |
| 7,357,193 | B2 | | 4/2008 | Harmon et al. |
| 7,753,134 | B1 | * | 7/2010 | Anderson et al. ......... 172/566 |
| 7,984,768 | B2 | * | 7/2011 | Schilling ................... 172/566 |
| 8,196,671 | B2 | | 6/2012 | Friestad |
| 2010/0230124 | A1 | | 9/2010 | Martin |

* cited by examiner

*Primary Examiner* — Thomas B Will
*Assistant Examiner* — Joel F. Mitchell
(74) *Attorney, Agent, or Firm* — Rebecca L. Henkel (57) ABSTRACT

A scraper for a coulter assembly is provided. One coulter assembly includes a scraper having an upper leading edge section positioned adjacent to a central portion of a disc blade and configured to contact the disc blade while the disc blade is substantially undeflected, and a lower leading edge section positioned adjacent to an outer portion of the disc blade and configured to contact the disc blade while the disc blade is substantially undeflected. The upper leading edge section and the lower leading edge section are configured to maintain contact with the disc blade as the outer portion of the disc blade is deflected relative to the central portion of the disc blade along a substantially arcuate path.

11 Claims, 6 Drawing Sheets

SCRAPER FOR A COULTER ASSEMBLY

BACKGROUND

The invention relates generally to an agricultural implement and, more particularly, to a scraper for a coulter assembly.

In agricultural settings, disc openers are typically towed behind a work vehicle, such as a tractor, via a mounting bracket secured to a rigid frame of a disc drill. Disc openers are generally configured to excavate a trench into soil and to deliver seeds, fertilizer, or other products into the trench. Specifically, certain disc openers include a disc, such as a coulter, that cuts into the soil as the disc opener moves along the terrain. A penetration depth of the disc is generally regulated by a gauge wheel, which is typically positioned adjacent to the disc and rotates across the soil surface. The disc is positioned below the gauge wheel such that the disc penetrates the soil. A vertical offset distance between the disc and the gauge wheel determines the penetration depth (e.g., seed depth, furrow depth) of the disc.

Such disc openers often include a scraper disposed adjacent to the disc to remove accumulated soil. In certain configurations, the scraper is positioned along a soil engaging portion of the disc. Such scraper configurations serve to remove soil that may otherwise accumulate on the disc, to maintain the trench profile formed by the disc, and to increase the consistency of seeding depth. In certain configurations, the disc may be angled relative to the direction of travel to increase the width of the excavated trench. Consequently, contact between the side of the disc and the soil will induce a force on the flat disc, thereby deflecting an outer portion of the disc relative to a central portion of the disc along a substantially arcuate path. Therefore, contact between the outer portion of the disc and a bottom edge of the scraper will drive the scraper away from the disc, thereby creating a gap between the scraper and the disc. As a result, the effectiveness of the scraper may be substantially reduced, and/or debris may become lodged between the scraper and the disc.

BRIEF DESCRIPTION

In one embodiment, a coulter assembly includes a scraper configured to pivot about an axis extending through a central portion of a disc blade. The scraper includes a leading edge, and a top point of the leading edge is positioned adjacent to the axis and to the central portion of the disc blade.

In another embodiment, a coulter assembly includes a support structure and a disc blade rotatably mounted to the support structure. The coulter assembly also includes a mounting bracket pivotally coupled to the support structure to form a pivot axis extending through a central portion of the disc blade. The coulter assembly includes a scraper having a mounting portion and a leading edge. The mounting portion of the scraper is rigidly coupled to the mounting bracket and a top point of the leading edge is positioned adjacent to the pivot axis and to the central portion of the disc blade.

In another embodiment, a coulter assembly includes a scraper having an upper leading edge section positioned adjacent to a central portion of a disc blade and configured to contact the disc blade while the disc blade is substantially undeflected, and a lower leading edge section positioned adjacent to an outer portion of the disc blade and configured to contact the disc blade while the disc blade is substantially undeflected. The upper leading edge section and the lower leading edge section are configured to maintain contact with the disc blade as the outer portion of the disc blade is deflected relative to the central portion of the disc blade along a substantially arcuate path.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
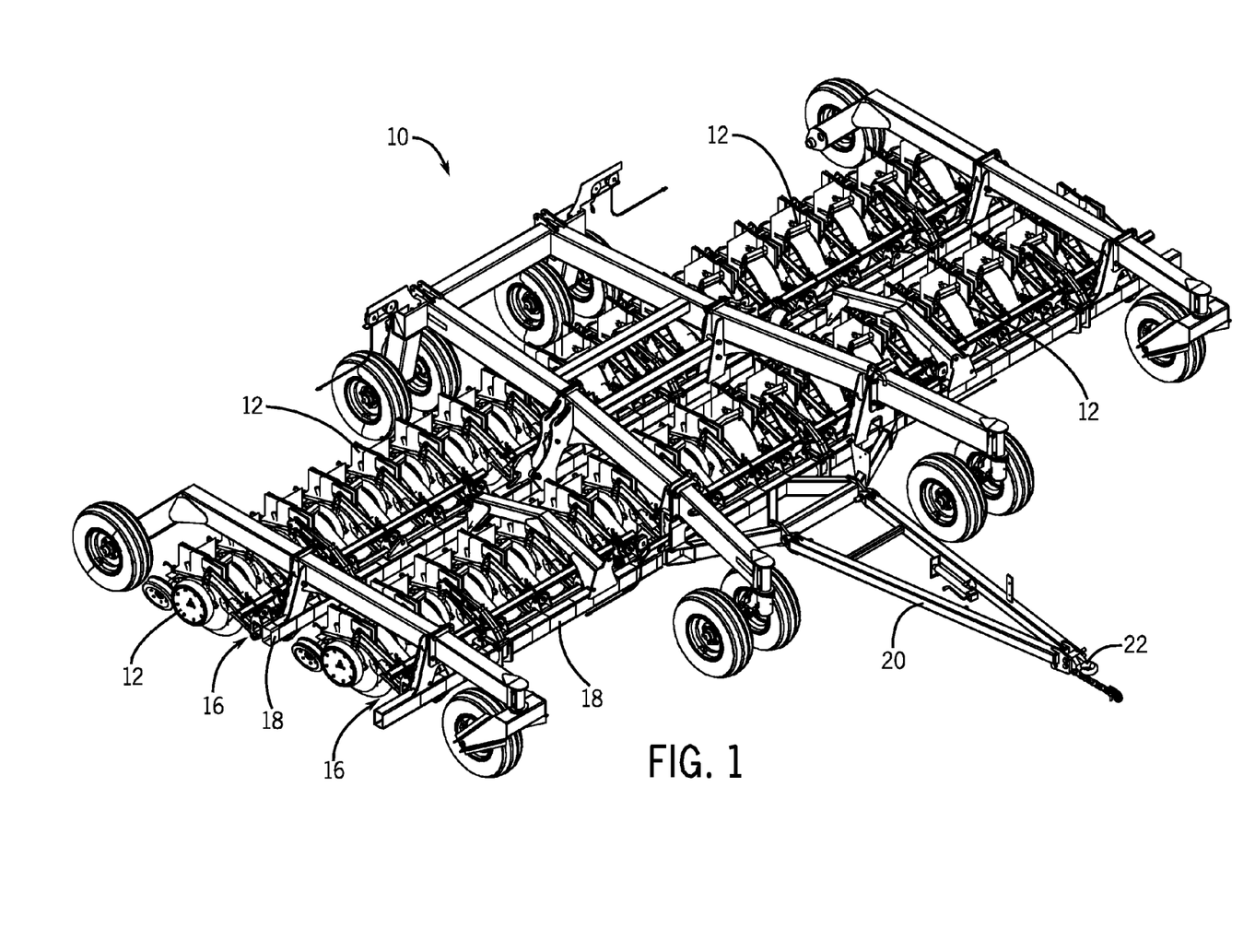
FIG. 1 is a perspective view of a towable agricultural implement including multiple disc openers.

FIG. 1 is a perspective view of a towable agricultural implement 10, including multiple disc openers 12. As discussed in detail below, each disc opener 12 includes a disc (e.g., coulter) configured to excavate a trench into soil. A product delivery assembly positioned behind the disc may then inject a product (e.g., seed, fertilizer, etc) into the trench. As illustrated, parallel linkage assemblies 16 secure the disc openers 12 to a tool bar 18. In the present embodiment, the tool bar 18 includes 36 disc openers 12. Further embodiments may include more or fewer disc openers 12. For example, certain embodiments may include 30, 36, 40, 48, 60, 64, 72, 80, 96, or more disc openers 12. The tool bar 18 is coupled to a tow bar 20, including a hitch 22. The hitch 22 may, in turn, be coupled to a tractor or air cart such that the towable agricultural implement 10 may be pulled through a field.

As discussed in detail below, a scraper is disposed adjacent to a soil engaging portion of each disc to remove accumulated soil from the disc. In certain configurations, the scraper serves to maintain the trench formed by the disc and to facilitate delivery of product to the soil. In such configurations, the scraper is configured to pivot about an axis that extends through a central portion of the disc. Furthermore, the scraper includes a leading edge, and a top point of the leading edge is positioned adjacent to the axis and to the central portion of the disc. In such a configuration, an upper leading edge section and a lower leading edge section of the scraper will maintain contact with the disc as an outer portion of the disc blade is deflected relative to a central portion of the disc blade along a substantially arcuate path. By way of example, contact between the side of the disc and the soil will induce a force on the flat disc, thereby deflecting the outer portion of the disc relative to the central portion of the disc along a substantially arcuate path. As the outer portion of the disc deflects, contact between the outer portion of the disc and the lower leading edge section of the scraper will induce the scraper to rotate about the axis. Because the axis extends through the central portion of the disc blade and is positioned adjacent to the top point of the leading edge of the scraper, the upper leading edge section and the lower leading edge section of the scraper will maintain contact with the disc during the deflection. As a result, the gap between the disc and the scraper will be significantly smaller than a gap formed by a scraper having only one point of contact with the disc. Consequently, the possibility of debris accumulation within the gap will be substantially reduced.

Figure 2:
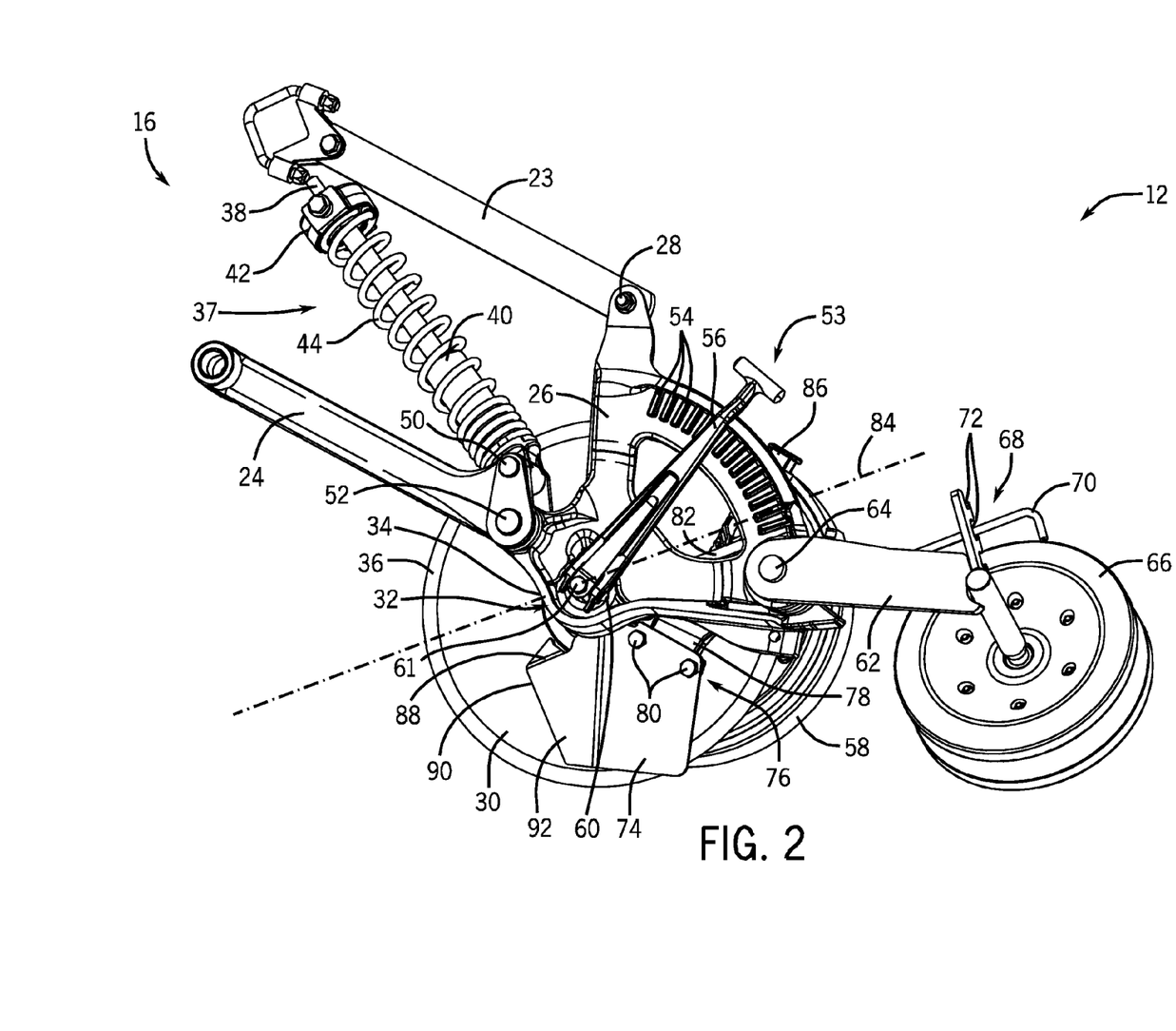
FIG. 2 is a detailed perspective view of an embodiment of a disc opener that may be employed within the towable agricultural implement of FIG. 1.

FIG. 2 is a detailed perspective view of the disc opener 12 of FIG. 1. The disc opener 12 (e.g., coulter assembly) is coupled to the tool bar 18 via the parallel linkage assembly 16. The parallel linkage assembly 16 is formed by an upper link 23 and a lower link 24. As illustrated, the opposite end of the upper link 23 is rotatably coupled to a support structure 26 by a fastener 28. The fastener 28 and the parallel linkage assembly 16 enable the disc opener 12 to raise and lower relative to the tool frame in response to obstructions or variations in the terrain. The disc opener 12 also includes a disc 30 (e.g., disc blade, coulter, etc.) rotatably coupled to the support structure 26 by a bearing assembly 32. The bearing assembly 32 enables the disc 30 to freely rotate as the disc engages the soil and excavates a trench. The disc 30 includes a central portion 34 and an outer portion 36. Furthermore, the central portion 34 includes the region of the disc 30 that couples to the hub or bearing assembly. As illustrated, the outer portion 36 has a sharpened edge for penetrating the soil.

The disc opener 12 includes a spring assembly 37. The spring assembly 37 includes a bolt/tube assembly 38 that connects a lower trunnion 40 to an upper trunnion 42. The bolt/tube assembly 38 and lower trunnion 40 are surrounded by a compression spring 44. A hydraulic actuator (not shown) is configured to compress the spring assemblies 37 of an entire set of openers 12. The pressure applied by the hydraulic actuator may vary in order to adjust the spring 44 compression and thus adjust a force applied to the disc opener 12. It will be appreciated that while the hydraulic actuator applies force, the spring 44 may still flex and allow the opener 12 to move in response to conditions of the terrain. Further, the spring 44 may be decompressed until it reaches its travel limit. When the spring 44 is sufficiently decompressed, the disc 30 will be removed from the soil. The spring assembly 37 is rotatably coupled to the lower link 24 by a fastener 50 to enable the spring assembly 37 to rotate relative to the lower link 24. Furthermore, the lower link 24 is rotatably coupled to the support structure 26 by a fastener 52 to facilitate rotation of the lower link 24 relative to the support structure 26.

The support structure 26 includes a depth adjustment assembly 53 having depth gauge notches 54 and a depth adjustment arm 56. The depth adjustment assembly 53 is configured to adjust a position of a gauge wheel 58 relative to the disc 30. The depth adjustment arm 56 may be moved to any of the notches 54 to change the position of the gauge wheel 58. Because the gauge wheel 58 travels along the surface of the soil, varying the position of the gauge wheel 58 alters the penetration depth of the disc 30 into the soil. In certain embodiments, the gauge wheel 58 is positioned against the disc 30 to remove soil from the side of the disc 30 during operation. The depth adjustment arm 56 is rotatably coupled to the support structure 26 by a spindle 60 and a fastener 61 that together enable the depth adjustment bar 56 to be adjusted among the depth gauge notches 54. Furthermore, the spindle 60 couples the depth adjustment bar 56 to the gauge wheel 58. A support arm 62 is rotatably coupled to the support structure 26 by a fastener 64. A packer wheel 66 is coupled to the support arm 62, and configured to close the trench formed by the disc 30, thereby burying the product placed in the trenches. The force applied to the packer wheel 66 may be adjusted by an adjustment assembly 68. The adjustment assembly 68 includes a torsion spring 70 that may be moved between notches 72 to set the desired force placed on the packer wheel 66.

The disc opener 12 also includes a scraper 74 disposed adjacent to the disc 30, and configured to remove accumulated soil from the disc 30. In the present embodiment, a mounting portion 76 of the scraper 74 is rigidly coupled to a mounting bracket 78 by fasteners 80. In alternative embodiments, the scraper 74 may be coupled directly to the support structure 26, or may be mounted using any mounting structure that creates a suitable pivot axis. The mounting bracket 78 is pivotally coupled by a shaft 82 to on the support structure 26. The disc opener 12 also includes a seed tube 86. Product is provided to the trenches through the seed tube 86.

The shaft 82 extends along a pivot axis 84 of the scraper 74. In certain configurations, the disc may be angled relative to the direction of travel to increase the width of the excavated trench. Consequently, as the disc 30 moves through the soil, a side force is applied to the disc 30 by the soil. Such a side force may bend the normally flat disc 30, thereby causing an outer portion of the disc to be deflected relative to a central portion of the disc along a substantially arcuate path. The scraper 74 is configured to remove accumulated soil from the disc 30 by tracking disc deflection. Due to the position and orientation of the pivot axis 84, an upper section 88 of a leading edge 90 of the scraper 74 maintains contact with the disc 30 as the disc deflects. Furthermore, a lower section 92 of the leading edge 90 also contacts the disc 30 as the disc 30 bends. Thus, as the disc deflects under soil loading, the upper leading section 88 and the lower leading section 92 may both maintain contact with the disc 30. As a result, the gap between the disc and the scraper will be significantly smaller than a gap formed by a scraper having only one point of contact with the disc. Consequently, the possibility of debris accumulation within the gap will be substantially reduced.

The pivot axis 84 extends from the mounting bracket 78 through the central portion 34 of the disc 30 toward the leading edge 90 of the scraper 74. In certain embodiments, the pivot axis extends directly through the center of the disc 30, while, in other embodiments, the pivot axis extends through an area within or below the bearing assembly 32 or hub mounting region of the disc 30. Furthermore, in some embodiments, the pivot axis extends from the mounting bracket 78 toward an area below the center of the disc 30, such as where the disc 30 begins to bend under soil loading. Therefore, the central portion 34 of the disc 30 includes the center, the bearing assembly 32 area, and the hub mounting region, and the central portion 34 extends outward from the center of the disc 30 at least to the point where the disc 30 begins to bend when deflected by the soil. As will be appreciated, with the pivot axis oriented as described, the gap between the disc 30 and portions of the leading edge 90 that do not contact the disc 30 may be smaller than in configurations with a pivot axis in a different position/orientation.

Figure 3:
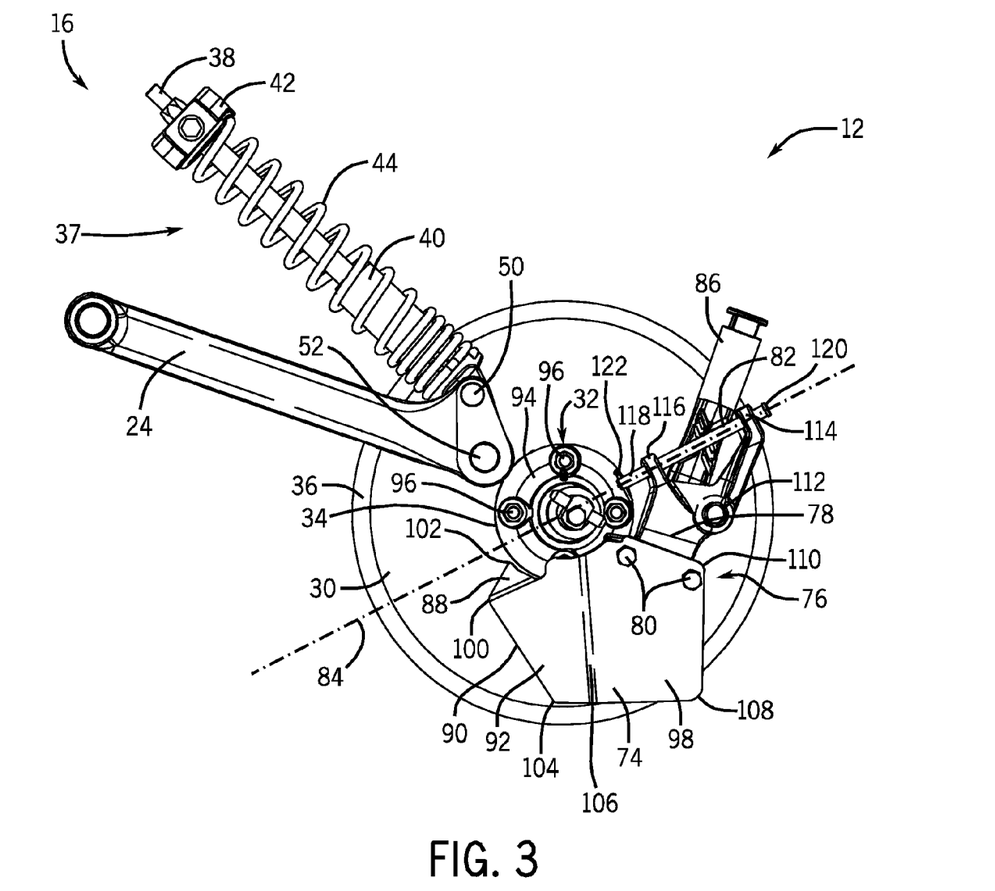
FIG. 3 is a side view of the disc opener of FIG. 2, showing an embodiment of a scraper.

FIG. 3 is a side view of the disc opener 12 of FIG. 2. As illustrated, a hub 94 is coupled to the central portion 34 of the disc 30. The scraper 74, as previously described, includes the upper leading edge section 88 and the lower leading edge section 92. The scraper 74 also includes a trailing section 98. When moving through the soil, the leading sections 88 and 92 engage the soil, and contact the disc 30 to remove accumulated soil from the disc. The upper leading section 88 and the lower leading section 92 intersect to form a point 100 located on the leading edge 90. In certain embodiments, the leading edge 90 extends from a top point 102 of the upper leading section 88 to a bottom point 104 of the lower leading section 92. A ridge 106 is formed at the intersection between the sections 92 and 98. The trailing section 98 includes a beveled lower corner 108 and an upper corner 110 adjacent to the mounting portion 76 of the scraper 74.

The mounting bracket 78 includes an opening 112 where a compression spring may be inserted to fit between the mounting bracket 78 and the support structure 26. The compression spring exerts pressure from the support structure 26 toward the mounting bracket 78 to hold the bracket 78 against the disc 30. The mounting bracket 78 includes a first arm 114 and a second arm 116. During assembly, a first end 118 of the shaft 82 is inserted through an opening in the first arm 114, through mounts on the bracket 26, and through an opening in the second arm 116. A second end 120 of the shaft 82 has a diameter greater than the opening in the first arm 114 to block the second end 120 of the shaft 82 from passing through the first arm 114. A locking pin 122 is inserted through an opening in the first end 118 of the shaft 82 to secure the shaft 82 in place and to block the first end 118 from passing through the second arm 116.

As illustrated, the shaft 82 extends towards the central portion 34 of the disc 30, thereby establishing the pivot axis 84 of the scraper 74. As depicted, the point 102 on the leading edge 90 is positioned adjacent to the pivot axis. As a result of this configuration, the point 102 remains in contact with the disc 30 as the disc deflects under soil loading. Furthermore, the point 104 tracks the disc 30 as the disc 30 bends by maintaining contact with the outer portion 36 of the disc 30. Therefore, the scraper 74 may effectively remove soil from the disc 30 despite deflection of the outer portion of the disc along a substantially arcuate path. Because the points 102 and 104 remain in contact with the disc, a gap formed between the scraper and the disc will be significantly smaller than a gap formed by a scraper having only one point of contact with the disc. Consequently, the possibility of debris accumulation within the gap will be substantially reduced.

Figure 4:
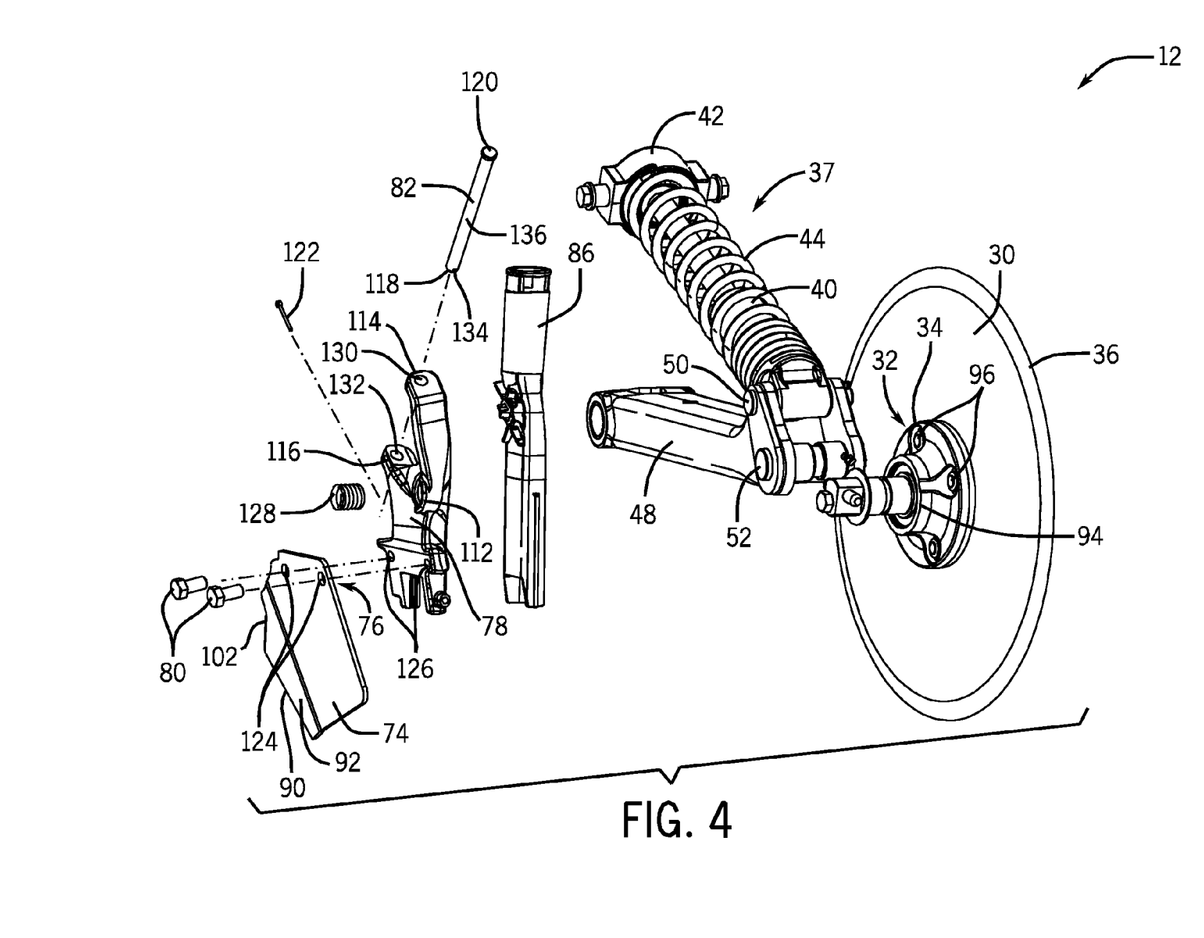
FIG. 4 is an exploded view of the disc opener of FIG. 3.

FIG. 4 is an exploded view of the disc opener 12 of FIG. 3. The scraper 74 is coupled to the mounting bracket 78 by inserting the fasteners 80 through openings 124 extending through the mounting portion 76 of the scraper 74. The fasteners 80 are then inserted within receptacles 126 within the mounting bracket 78. The fasteners 80 are secured in place to rigidly hold the scraper 74 against the mounting bracket 78. A spring 128 is inserted into the opening 112 in the mounting bracket 78 to provide a compression force toward the mounting bracket 78, when the disc opener 12 is fully assembled.

The mounting bracket 78 is pivotally coupled to the support structure 26. During assembly, the first end 118 of the shaft 82 is inserted through an opening 130 in the first arm 114. The first end 118 of the shaft 82 is also inserted through an opening in the support structure 26 (from FIG. 2) and through an opening 132 in the second arm 116. The shaft 82 is secured by inserting the locking pin 122 through an opening 134 in the first end 118 of the shaft 82. Thus, the shaft 82 is locked within the arms 114 and 116 of the mounting bracket 78. A shaft body 136 may be inserted into slots in the seed tube 86. The combined assembly including the scraper 74 and the mounting bracket 78 are secured to the support structure 26 adjacent to the disc 30. As may be appreciated, the seed tube 86 is held in place by the shaft 82, which serves the dual purpose of acting as the pivot axis for the scraper 74 and retaining the seed tube 86.

With the scraper 74 assembled to the disc opener 12 as described, the scraper 74 has a pivot axis extending through the central portion 34 of the disc 30 blade. Furthermore, the top point 102 of the leading edge 90 of the scraper 74 is positioned adjacent to the pivot axis, and adjacent to the central portion 34 of the disc 30 blade. Such a pivot axis allows the scraper 74 to pivot and track, or follow, the disc 30 as the outer portion of the disc is deflected under soil loading. In some embodiments, movement of the scraper 74 is reduced compared to conventional scrapers by the pivot axis being substantially perpendicular to the leading edge 90 of the lower leading section 92. Furthermore, in certain embodiments, the shape of the scraper 74 may cause the scraper 74 to be pressed against the disc 30 by soil pressure. In addition, the pivot axis may be angled toward the disc 30 such that as the pivot axis extends from the mounting portion 76 of the scraper 74 toward the leading edge 90 of the scraper 74, the pivot axis gets closer to the disc 30. Such a configuration may also press the scraper 74 against the disc 30. It will be appreciated that in the event of debris accumulating between the scraper 74 and the disc 30, soil will tend to hold the scraper 74 in a position against the disc 30 instead of further opening the gap between the disc 30 and the scraper 74.

In the present embodiment, the components of the disc opener 12 may experience less wear than disc openers 12 having scrapers that are not configured to follow disc 30 deflection. For example, the position and orientation of the rotation axis may reduce scraper 74 wear by allowing the scraper 74 to lie substantially flat against the disc 30 as it deflects. This reduces the amount of the scraper 74 that is exposed to soil, and thus reduces the erosive wear acting against the scraper 74. The soil has less contact with the scraper 74 at least because the scraper 74 is held against the disc 30 in at least two locations (e.g., a point at the top and a point at the bottom of the leading edge 90). Therefore, the scraper 74 lies flat against the coulter disc 30 and is not forced into the soil. Because the soil force assists in holding the scraper 74 against the disc 30, the spring 128 may also be smaller than otherwise required. Therefore, there exists minimal wear to the components exerting force to hold the scraper 74 to the disc 30 and minimal wear between the scraper 74 and the disc 30. As will be appreciated, the scraper 74 may be mounted using other mounting structures. These other structures may secure the scraper 74 in place and provide a pivot axis to hold a top and bottom portion of the scraper 74 against a disc during induced deflection. For example, in certain embodiments, a four-bar or parallel linkage may be used to secure the scraper 74 in place instead of using the shaft 82. Furthermore, other embodiments may include soft compression blocks to secure the scraper 74.

Figure 5:
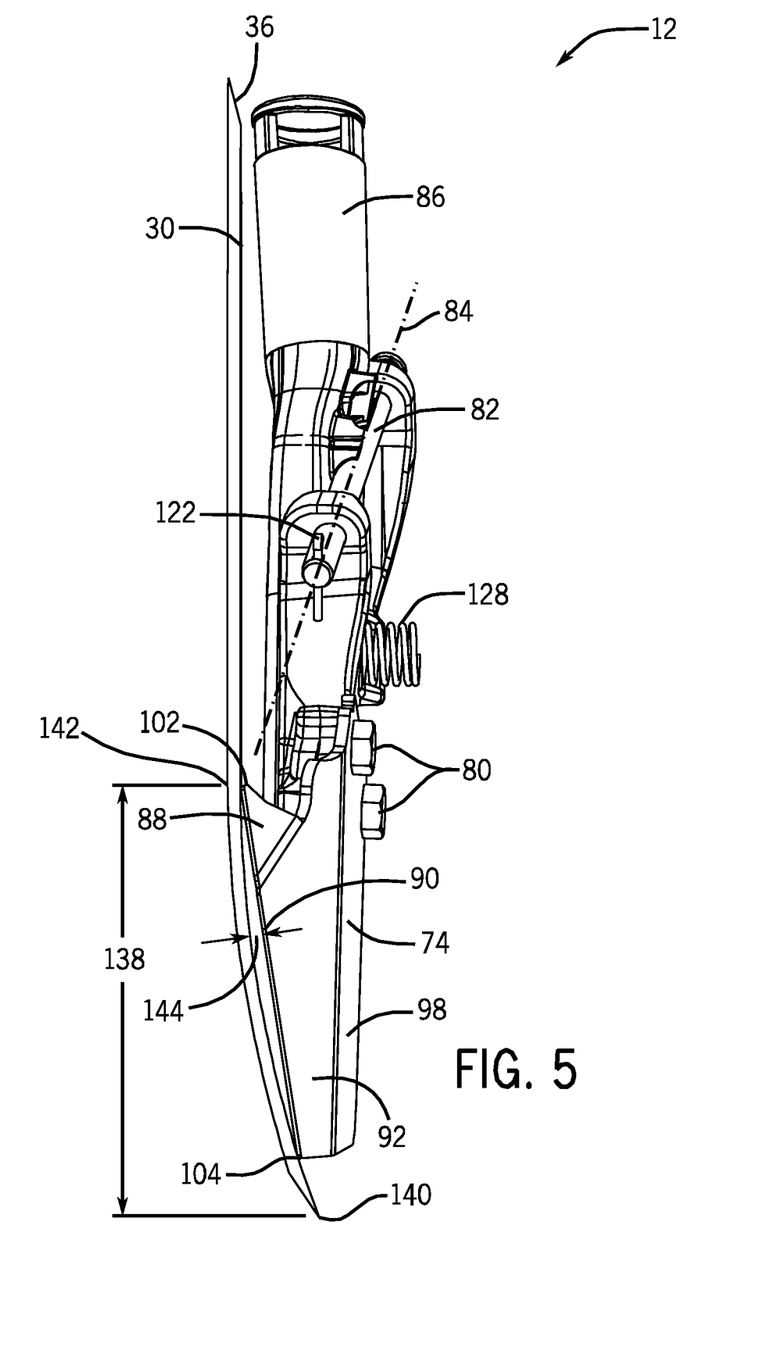
FIG. 5 is a front view of the disc opener of FIG. 3, illustrating scraper movement upon disc deflection.

FIG. 5 is a front view of the disc opener 12 of FIG. 4, illustrating scraper movement during disc 30 deflection. As illustrated, the disc 30 bends, or exhibits deflection, along a length 138 of the disc 30. When the deflection occurs, a lower portion 140 of the disc 30 is bent away from its normal, undeflected position, while a portion 142 closer to the center of the disc 30 remains substantially undeflected. In certain configurations, the portion 142 of the disc 30 is part of the central portion of the disc 30 blade. As the disc 30 bends, contact between the disc 30 and the point 104 on the scraper 74 induces the scraper to pivot about the axis 84. Furthermore, point 102 remains in contact with the disc 30 due to the location and orientation of the pivot axis 84, which extends along a line through the shaft 82. Therefore, a gap 144 is created between the disc 30 and the leading edge 90. However, the gap 144 is reduced compared to conventional scrapers because the point 102 is positioned adjacent to the axis of rotation 84. For example, in configurations that do not include the pivot axis as described herein, the point 102 would move away from the disc 30 as deflection occurs, establishing a substantial gap between the disc 30 and the scraper 74.

Figure 6:
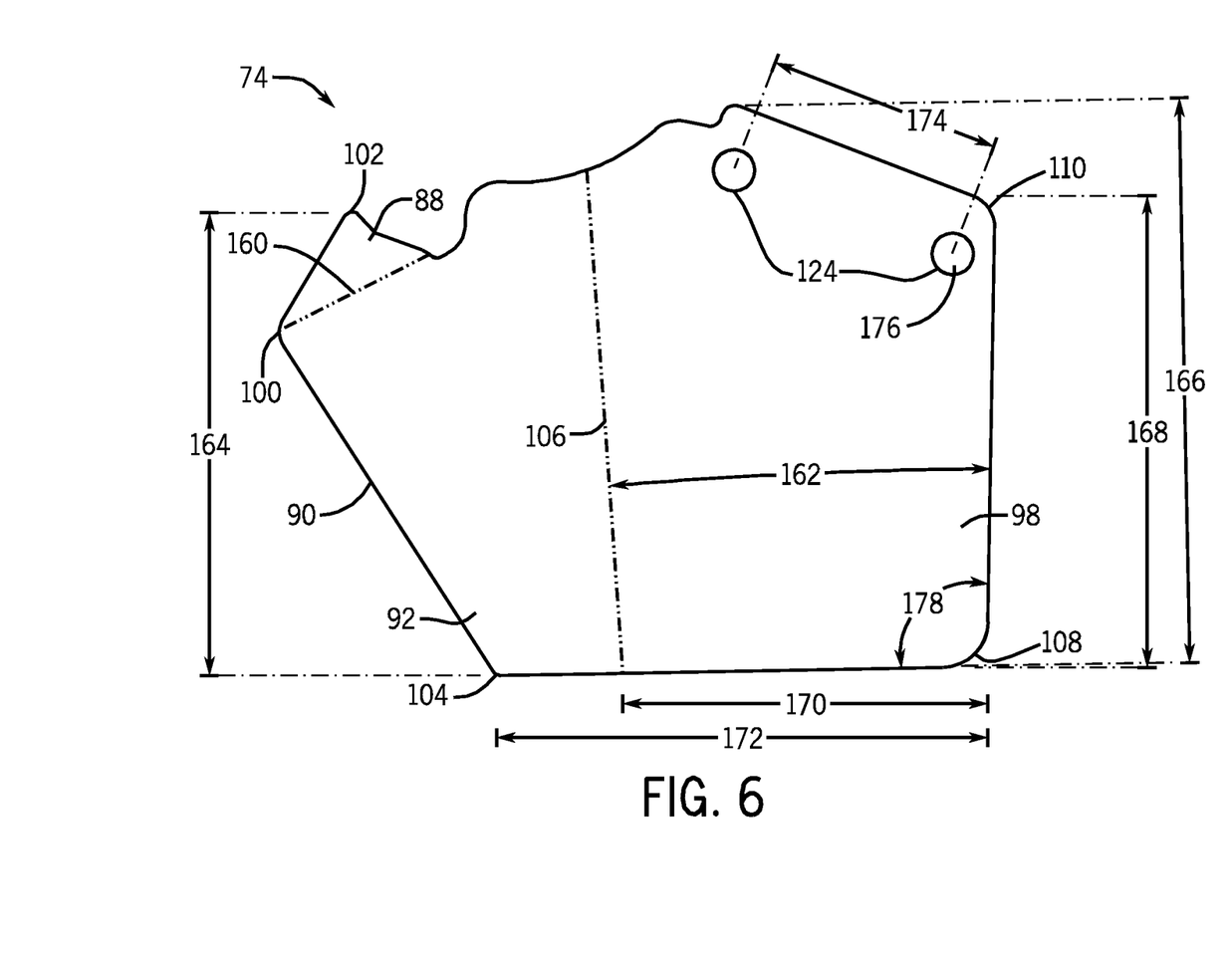
FIG. 6 is a side view of an embodiment of a scraper that may be employed within the disc opener of FIG. 3.

FIG. 6 is a side view of an embodiment of a scraper that may be employed within the disc opener of FIG. 3. As previously described, the scraper 74 is divided into the upper leading section 88, the lower leading section 92, and the trailing section 98. A ridge 160 separates the upper leading section 88 from the lower leading section 92. In certain embodiments, the upper leading section 88 slopes downwardly from the ridge 106 to the point 102. For example, the upper leading section 88 may slope downwardly about 20 to 40 degrees (e.g., about 30 degrees) toward the point 102. In addition, in certain embodiments, the lower leading section 92 slopes downwardly from the ridge 106 to the point 100. For example, the lower leading section 92 may slope downwardly about 10 to 20 degrees (e.g., about 14 degrees) toward the point 100. Likewise, the trailing section 98 may slope downwardly from the ridge 106 to the trailing edge of the scraper 74 along an area 162. For example, in certain embodiments, the trailing section 98 may slope downwardly about 1 to 10 degrees (e.g., about 5 degrees) along the area 162.

The leading edge of the scraper 74 has a length 164 that extends from the point 102 to the point 104. In certain embodiments, the length 164 may be approximately 140 to 160 mm. For example, the length 164 may be approximately 153 mm. Furthermore, the maximum length 166 of the trailing section 98 may be approximately 170 to 200 mm. For example, in certain embodiments, the length 166 may be approximately 184 mm. In addition, in certain embodiments, a length 168 from the corner 108 to the corner 110 may be approximately 140 to 160 mm (e.g., about 150 mm).

In certain embodiments, the trailing section 98 has a width 170 of approximately 100 to 130 mm. For example, the width 170 of the trailing section 98 may be approximately 118 mm. In addition, bottom of the scraper 74 extending from point 104 to corner 108 may have a length 172 of approximately 150 to 170 mm. For example, the length 172 may be approximately 160 mm. Furthermore, the distance 174 between the openings 124 may be approximately 70 to 80 mm (e.g., about 76 mm). The diameter 176 of the openings 124 may be approximately 10 to 15 mm (e.g., about 14 mm). An angle 178 between trailing edge and the bottom of the scraper may be approximately 90 to 95 degrees. For example, in certain embodiments, the angle 178 may be approximately 92 degrees. Furthermore, the scraper 74 may have a thickness of approximately 3 to 8 mm (e.g., about 5 mm). In addition, the scraper 74 may be constructed from any suitable material, such as stainless steel, an alloy, another metal, or a polymeric material.

The illustrated geometry of the scraper 74 may enable the points 102 and 104 to both contact the disc 30 as the disc deflects under soil pressure and when no deflection occurs. Further, the angles between sections of the scraper 74 may assist in removing soil from the disc 30. Although one particular scraper 74 is depicted in FIG. 6, the scraper used within the disc opener 12 may be different than illustrated. For example, in certain embodiments, the scraper 74 may be formed from a flat piece of material. Furthermore, the shape and dimensions of the scraper 74 or scraper sections may vary from the embodiments described above. In any event, the scraper 74 is positioned along a pivot axis that enables the top point 102 of the leading edge 90 to remain in contact with the disc 30 as the disc deflects under soil pressure. Furthermore, because the pivot axis extends through the central portion of the disc blade and is positioned adjacent to the top point of the leading edge of the scraper, the upper leading edge section and the lower leading edge section of the scraper will maintain contact with the disc during the deflection. As a result, the gap between the disc and the scraper will be significantly smaller than a gap formed by a scraper having only one point of contact with the disc. Consequently, the possibility of debris accumulation within the gap will be substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coulter assembly comprising:
a scraper configured to pivot about an axis extending through a central portion of a disc blade, wherein the scraper includes a leading edge, and a top point of the leading edge is positioned adjacent to the axis and to the central portion of the disc blade, and wherein the axis extends closer to the top point of the leading edge than to a bottom portion of a mounting bracket that mounts the scraper to the coulter assembly, and wherein the mounting bracket provides structural support to pivotally couple the scraper to the coulter assembly;
wherein the scraper comprises an upper leading edge section positioned adjacent to the central portion of the disc blade and configured to contact the disc blade while the disc blade is substantially undeflected, and a lower leading edge section positioned adjacent to an outer portion of the disc blade and configured to contact the disc blade while the disc blade is substantially undeflected, and wherein the upper leading edge section and the lower leading edge section are configured to maintain contact with the disc blade as the outer portion of the disc blade is deflected relative to the central portion of the disc blade along a substantially arcuate path.

2. The coulter assembly of claim 1, wherein the lower leading edge section is substantially perpendicular to the axis.

3. The coulter assembly of claim 1, wherein the axis extends toward a plane formed by the disc blade.

4. The coulter assembly of claim 1, wherein the scraper comprises a mounting portion rigidly coupled to the mounting bracket.

5. The coulter assembly of claim 4, comprising a shaft configured to pivotally couple the mounting bracket to a support structure, wherein the shaft is loosely held within the mounting bracket.

6. The coulter assembly of claim 1, wherein the scraper is configured to move through soil during operation.

7. A coulter assembly comprising:
a support structure;
a disc blade rotatably mounted to the support structure;
a mounting bracket pivotally coupled to the support structure to form a pivot axis extending through a central portion of the disc blade and toward a plane formed by the disc blade; and
a scraper having a mounting portion and a leading edge, wherein the mounting portion is rigidly coupled to the mounting bracket and a top point of the leading edge is positioned adjacent to the pivot axis and to the central portion of the disc blade, wherein the pivot axis extends closer to the top point of the leading edge than to a bottom portion of the mounting bracket;
wherein the scraper comprises an upper leading edge section positioned adjacent to the central portion of the disc blade and configured to contact the disc blade while the disc blade is substantially undeflected, and a lower leading edge section positioned adjacent to an outer portion of the disc blade and configured to contact the disc blade while the disc blade is substantially undeflected, and wherein the upper leading edge section and the lower leading edge section are configured to maintain contact with the disc blade as the outer portion of the disc blade is deflected relative to the central portion of the disc blade along a substantially arcuate path.

8. The coulter assembly of claim 7, comprising a shaft configured to pivotally couple the mounting bracket to the support structure.

9. The coulter assembly of claim 8, wherein the shaft is loose within the mounting bracket.

10. The coulter assembly of claim 8, wherein the axis extends into the plane formed by the disc blade.

11. The coulter assembly of claim 7, wherein the lower leading edge section is substantially perpendicular to the axis.

\* \* \* \* \*